(12) United States Patent
Zsigmond (10) Patent No.: US 7,644,723 B2
(45) Date of Patent: Jan. 12, 2010

(54) TRANSMIX PREVENTION LOCK

(76) Inventor: Endre Zsigmond, 8513 Bellhaven Pl., NE., Albuquerque, NM (US) 87112

( * ) Notice: Subject to any disclaimer, the term of this patent is extended or adjusted under 35 U.S.C. 154(b) by 944 days.

(21) Appl. No.: 11/131,526

(22) Filed: May 18, 2005

(65) Prior Publication Data

US 2006/0260683 A1    Nov. 23, 2006

(51) Int. Cl.
*B01D 17/02* (2006.01)
(52) U.S. Cl. ................ 137/172; 141/303; 137/420; 137/422; 137/456
(58) Field of Classification Search ............ 137/456, 137/420, 422, 172; 251/65; 141/301, 303, 141/306, 310; 220/86.2
See application file for complete search history.

(56) References Cited

U.S. PATENT DOCUMENTS

| | | | |
|---|---|---|---|
| 2,231,158 A * | 2/1941 | Davis ..................... 251/65 |
| 2,292,648 A * | 8/1942 | Moore ................ 122/448.1 |
| 3,467,135 A * | 9/1969 | Muskalla ................. 137/410 |
| 3,742,974 A | 7/1973 | Phillips |
| 3,757,813 A | 9/1973 | Levenberg |
| 4,491,143 A * | 1/1985 | Yasuhara ................ 137/172 |
| 4,537,232 A | 8/1985 | Barber |
| 4,632,139 A | 12/1986 | Delwiche |
| 4,828,707 A | 5/1989 | Staehle et al. |
| 4,865,070 A | 9/1989 | Delwiche |
| 4,960,513 A | 10/1990 | Young |
| 4,987,922 A | 1/1991 | Andrepont et al. |
| 5,176,161 A | 1/1993 | Peters et al. |
| 5,701,924 A | 12/1997 | Coleman |

* cited by examiner

*Primary Examiner*—John Rivell
*Assistant Examiner*—Craig M Schneider
(74) *Attorney, Agent, or Firm*—Dennis F. Armijo (57) ABSTRACT

A method and apparatus for preventing a dense liquid such as diesel fuel from being dispensed into a storage tank that contains a less dense liquid, such as gasoline fuel and vice versa. The unloading process happens by gravity through a vertical down hole. The invention uses the gravitational flow of the fluid, a movable float that is moved by contact with a fluid of a predetermined density, and a magnetic member to activate the stopping feature.

17 Claims, 7 Drawing Sheets

TRANSMIX PREVENTION LOCK

BACKGROUND OF THE INVENTION

1. Field of the Invention (Technical Field)

The present invention relates to fuel distribution and more particularly to a method and apparatus that prevents a wrong fuel product being dispensed into a storage tank.

2. Background Art

Presently there is a need for an apparatus or method to keep fuel tanker drivers from delivering the wrong fuel to a storage tank. Storage tanks are located in gas stations, truck stops, pipeline terminals, and refineries. Most storage tanks are underground, so it is impossible to visually determine what type of fuel the storage tank contains. Today most storage tanks are marked or color coded to alert the delivery person as to what type of fuel is contained within the tanks; however wrong deliveries still occur. In addition, delivery tankers have several compartments separated from each other to make it possible to transport different kinds of fuels at the same time such as gasoline and diesel. Due to the inattention of the driver, sometimes the driver unloads the wrong product into the wrong storage tank. When this happens, the intermixed fuel cannot be used because it will cause significant damage to any vehicle using the intermixed fuel. The same disastrous results occur with the use of the wrong fuel in a vehicle. In addition, an apparatus and/or method to prevent a wrong type of fuel from being dispensed from a holding tank to a vehicle tank are also necessary and can be accomplished with the present invention.

Several attempts have been made to solve a similar problem; however they are very complicated, costly, and require a separate power source for use. One of these prior art devices is discussed in U.S. Pat. No. 4,537,232. This device teaches an apparatus and method to disrupt the flow of the fluid upon detection of a nonconforming liquid. The device shuts down an electric pump, thus preventing the fluid from flowing. The device could not be used in an underground tank or down a filler hole and function completely on its own due to its size. The device needs electric wiring and power. It is designed to work on liquids that are pumped and are traveling upwards. Furthermore, it uses a two-step process; it shuts down a pump with an actuator, which in turn stops the flow. The device does not use the natural flow of the liquid to activate the flow-stopping feature.

Other prior art devices are disclosed in U.S. Pat. Nos. 4,632,139 and 4,865,070. Each of these devices separates liquids that are already mixed; they do not prevent mixing of unlike liquids. Further, they only work with liquids that do not mix with each other. The floating element in these devices is the actual stopper of the fluid and is not used to stop the flow of the wrong liquid down a filler tube or hole.

Other prior art devices use a floating device that sinks in a light liquid and floats in a dense liquid. The device is described in U.S. Pat. No. 4,537,232. However, as with other prior art devises, the stopping feature operates in one mode. For instance, they will only prevent a less dense fluid from flowing, but do not operate in a second mode; preventing a more dense fluid from flowing. The present invention operates in both modes. The floating device carries a prism to direct light to a photo electric cell or a magnet to disrupt electric power to stop a pump.

The present invention is a unique apparatus that prevents a wrong fluid from flowing, because fuels like gasoline and diesel mix very easily. The invention uses a one step process with no extraneous devices. It uses gravity to operate. The invention operates completely in a filler tube or down hole. It does not need electrical power, and it prevents the mixing of liquids that mix with each other. The invention activates a stopper that shuts down the flow of a liquid that flows by gravity.

SUMMARY OF THE INVENTION (DISCLOSURE OF THE INVENTION)

Delivering and unloading a wrong fuel product to a gas station or truck stop is not a common mistake, but when it happens it is very costly. To install a transmix prevention lock (TPL) in a fuel storage tank would eliminate this problem. The apparatus fits down a filler tube or down hole, stops the flow of a wrong fluid from flowing, and allows a right type of fluid to flow. The invention uses the gravitational flow of the fluid, a movable float that is moved by contact with a fluid of a predetermined density and magnetic member to activate the stopping feature. The present invention is easy to install and reset without causing any type of safety hazard. Once installed it does not need to be changed and requires minimal maintenance. The invention can also be used in cars, trucks or any gasoline or diesel powered equipment to prevent pumping the wrong fuel into the fuel tank.

A primary object of the present invention is to provide a method and apparatus to prevent a wrong fluid from flowing into a container.

Another object of the present invention is to provide a fail-safe method and apparatus that is self contained and does not require a power source.

Yet another object of the present invention is to provide a TPL that activates in a very short period of time.

A primary advantage of the present invention is its simplicity to manufacture and use.

Another advantage of the present invention is that it is inexpensive to manufacture.

Yet another advantage of the present invention is that it is easy to install and reset.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying out the Invention

Figure 1:
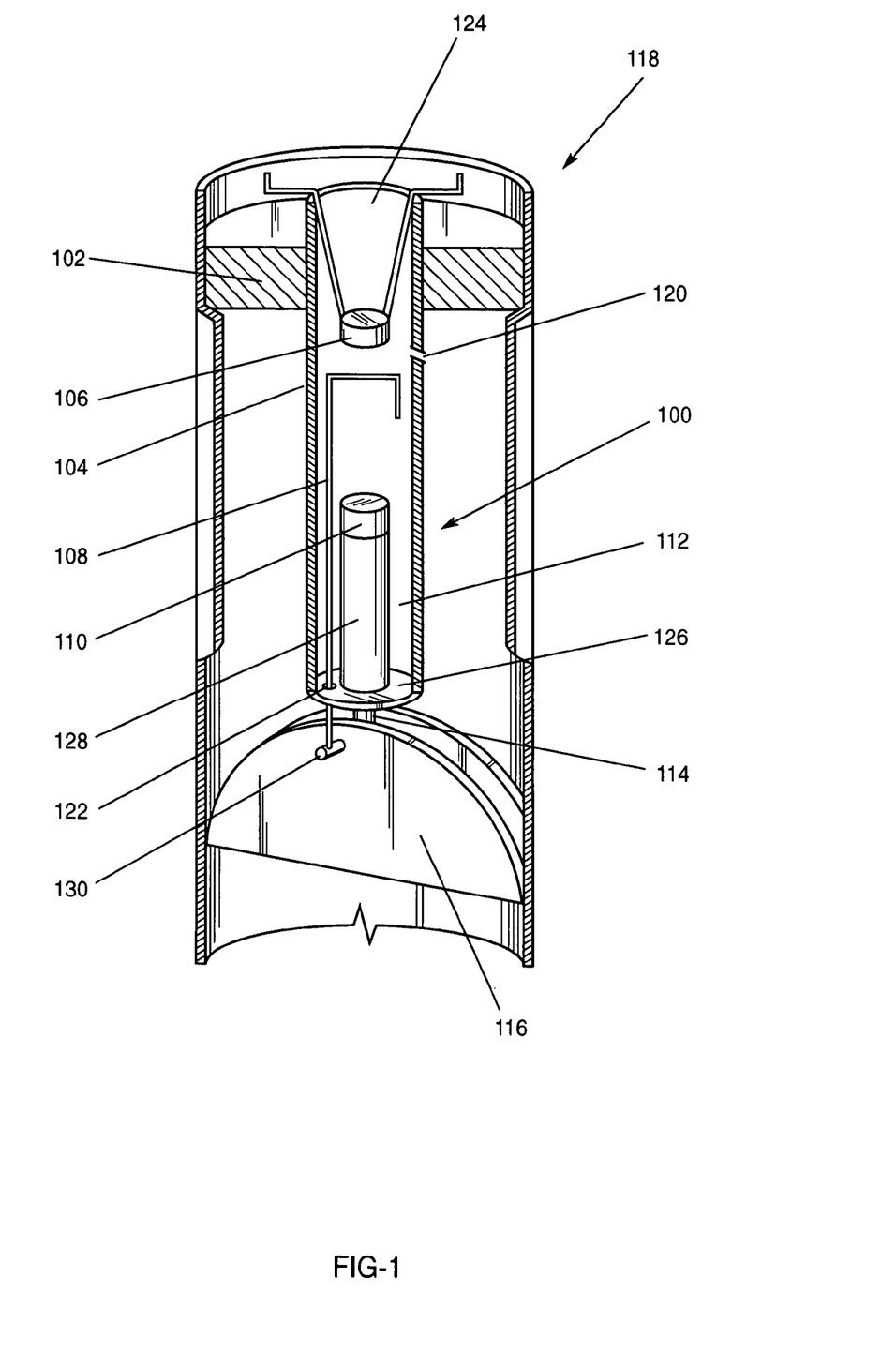
FIG. 1 shows the preferred embodiment of the invention in an open or flowing position.
Figure 2:
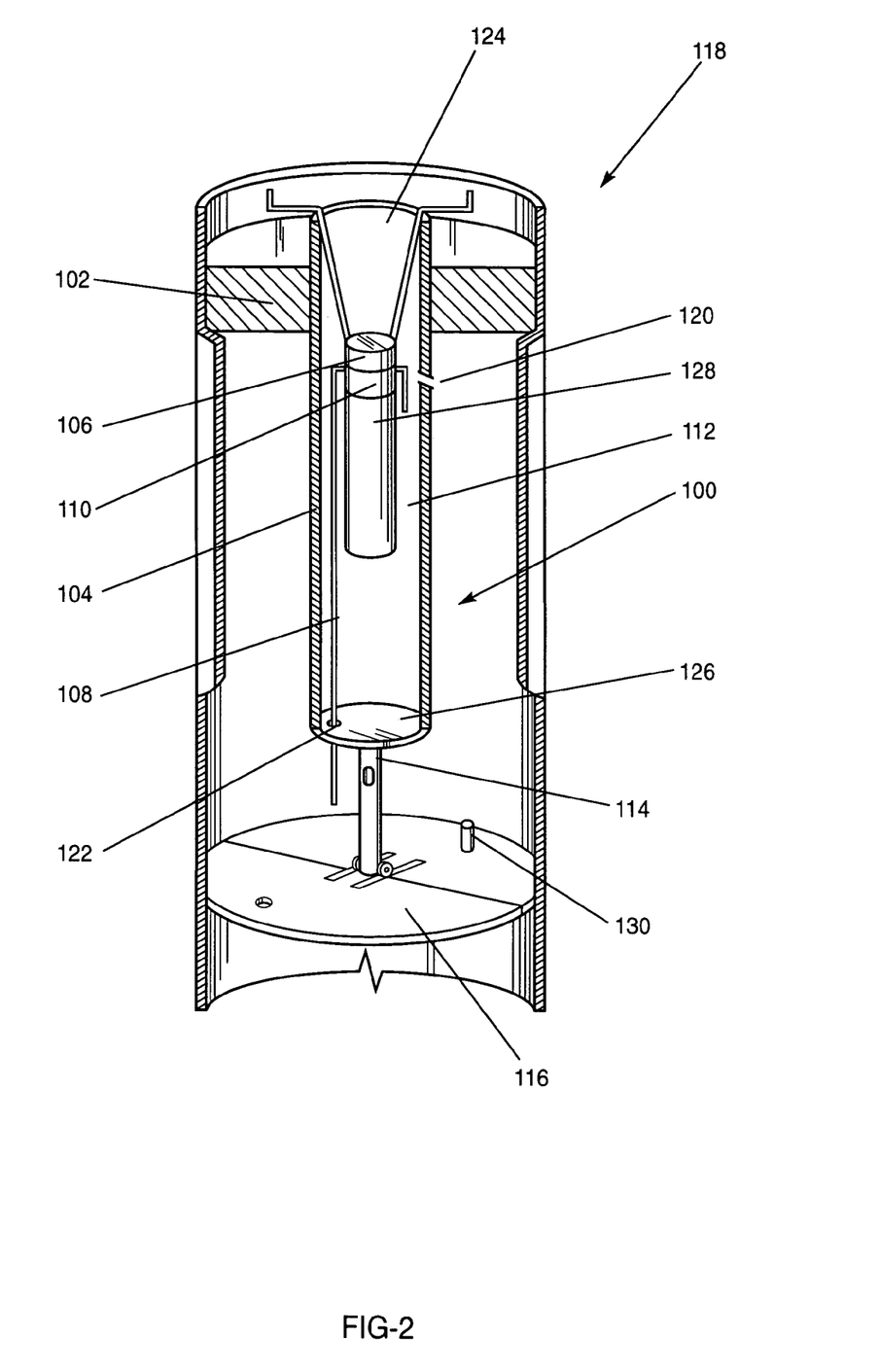
FIG. 2 shows the embodiment of FIG. 1 in a closed or non-flowing position.

FIGS. 1 and 2 show the first embodiment of the invention. This embodiment is used to activate the flow stopping action if a denser fluid is added. For example, if the tank is required to have gasoline and diesel is introduced, the invention is used to prevent the diesel from entering the tank. FIG. 1 shows the apparatus in a flowing or non-activated state and FIG. 2 shows the apparatus obstructing the flow or activated state. TPL 100 is placed inside of a down hole or filler tube 118 of a storage tank. TPL 100 is held in position by supporting bracket 102 that holds activation tube 104 substantially in the middle of filler tube 118. Although the embodiment of FIGS. 1 and 2 show a supporting bracket 102 consisting of a collar wedged onto a flange of filler tube 118, different affixing devices that are well known in the art can be used. The illustration is not meant to limit this feature. Activation tube 104 has an open end 124 for receiving the fluid and a closed bottom end 126 for containing the introduced fluid. Attached to the bottom of activation tube 104 is shaft 114 with spring-loaded stopper 116. FIG. 1 shows spring-loaded stopper 116 in a liquid flowing or folded position. Inside activation tube 104 is floating structure 112 that floats in a first liquid type and sinks in a second liquid type. For example, a floating structure that floats in diesel but sinks in gasoline. Floating structure 112 is smaller in diameter than activation tube 104 so it can move freely up or down inside activation tube 104. In the flowing or non-activated state, floating structure 112 sits on closed bottom end 126 of activation tube 104. A first magnetic member 110 is affixed to upper end 128 of floating structure 112. A second magnetic member 106 is affixed inside the top part of activation tube 104 at a predetermined distance from first magnetic member 110 to prevent the magnetic attraction from each other in the flowing mode. A first end of unlocking pin 108 is positioned between magnetic members 106 and 110, and a second end of unlocking pin 108 exits from closed bottom end 126 of activation tube 104 through a small exit aperture 122 and into release mechanism 130 which holds stopper 116 in a folded position.

In operation, the delivery person places TPL 100 into filler tube 118, as shown. When gasoline is introduced into filler tube 118, activation tube 104 fills with gasoline and floating structure 112 stays on bottom end 126 of activation tube 104 since it is heavier than gasoline. If diesel fuel is introduced into filler tube 118, activation tube 104 fills with diesel and since floating structure 112 is lighter than diesel, it floats and moves upwards. This in turn, moves first magnetic member 110 towards second magnetic member 106. Floating structure 112 with affixed first magnetic member 110 contacts unlocking pin 108. At a predetermined point, the magnetic attraction from the two magnetic members 106 and 110 is provided. The magnetic attraction and the force of the floating structure 112 causes unlocking pin 108 to move upward, activating release mechanism 130 which opens stopper 116 and stops the flow of the diesel fuel as shown in FIG. 2. To reset TPL 100, the delivery person has to close the unloading valve on the tanker truck, empty the hose and unhook it from filler tube 118. He lifts TPL 100 out of the filler tube 118, separates second magnetic member 106 from first magnetic member 110 by pulling unlocking pin 108 downwards or out of activation tube 104 until the floating structure 112 falls back to closed bottom end 126 of the activation tube 104, then he folds stopper 116 and secures it with unlocking pin 108. He can then set TPL 100 back into filler tube 118 and continue filling the tank with the correct fuel.

Figure 3:
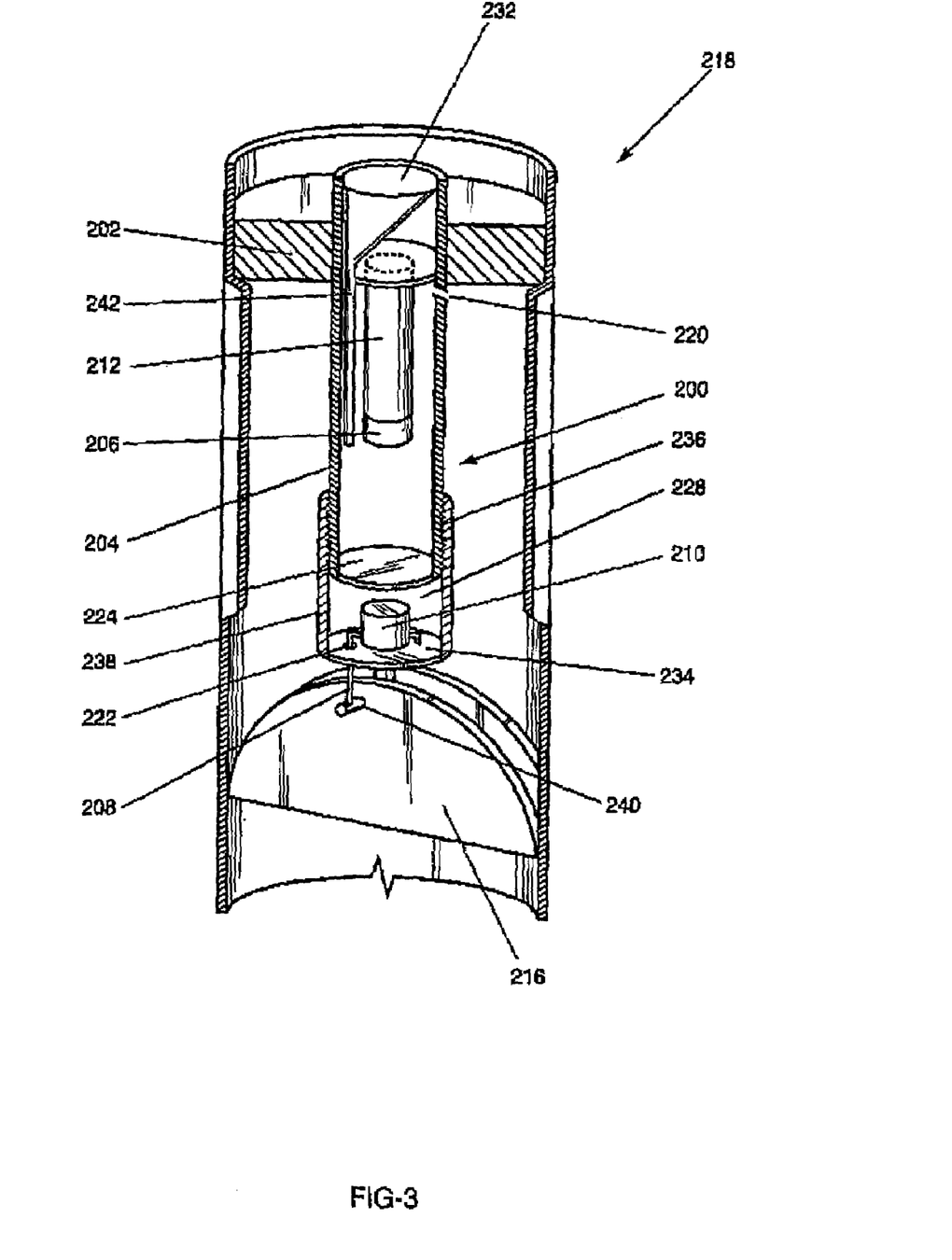
FIG. 3 is an alternative embodiment of the invention in an open or flowing position
Figure 4:
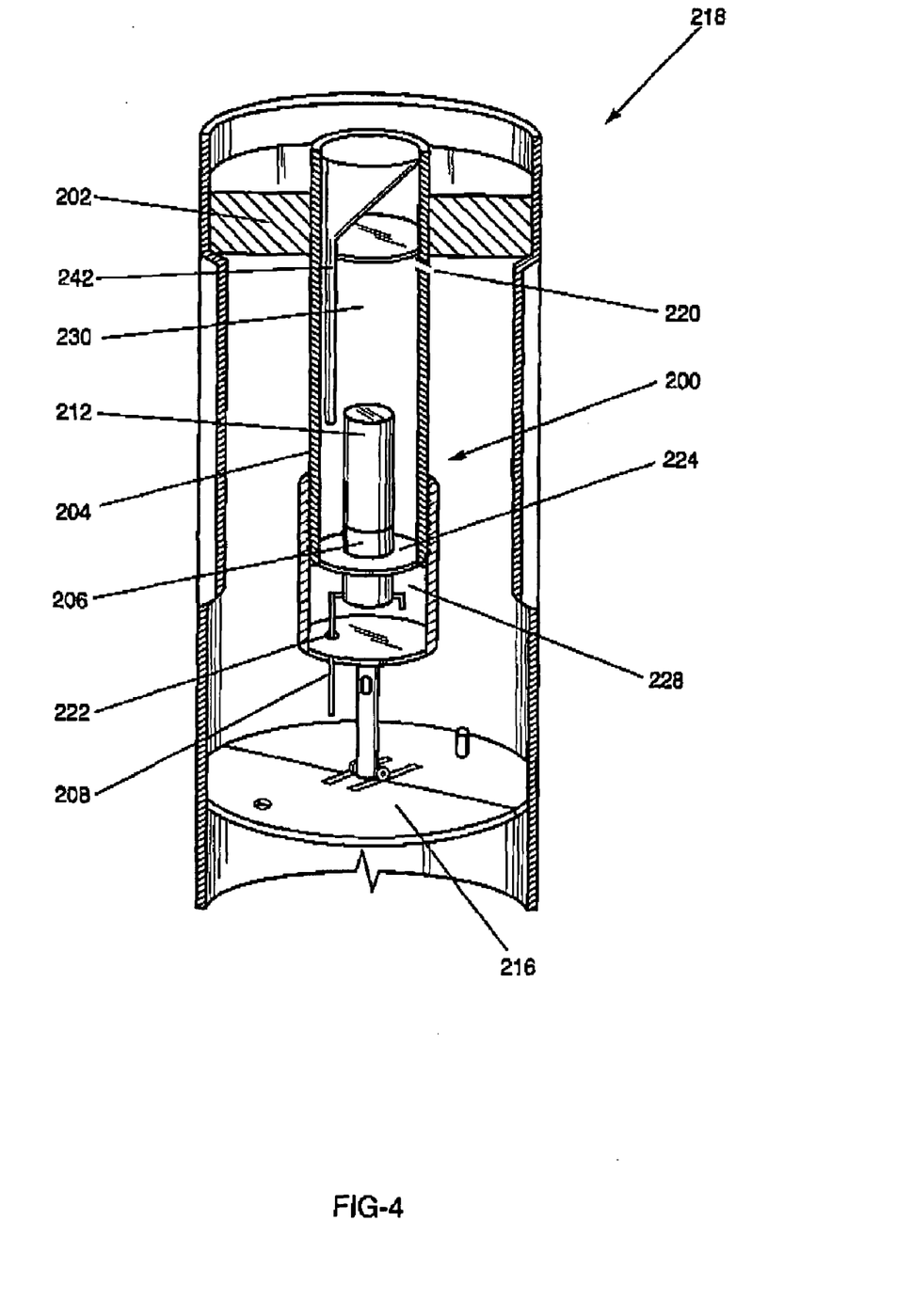
FIG. 4 shows the embodiment of FIG. 3 in a closed or non-flowing position.

A second embodiment of the present invention is shown in FIGS. 3 and 4. This embodiment is for the opposite uses of FIGS. 1 and 2. This embodiment is for stopping a less dense fluid from flowing. For example, if the tank contains diesel, this embodiment prevents gasoline from being introduced into the tank. As with the first embodiment, TPL 200 is affixed in filler tube 218 with supporting bracket 202 for holding activation tube 204 substantially in the middle of filler tube 218. Activation tube 204 has an open end 232 for receiving the liquid and closed bottom end 234. As shown, activation tube 204 has a separating wall 224 and forming chambers 228 and 230. Separating wall 224 is provided to keep floating structure 212 from sinking too far and to permit magnet 210 to move upwards. The lower part of activation tube 204 can be threaded 236 to accommodate second and shorter tube 238. Activation tube 204 comprises long chamber 230, and second or shorter tube 238 comprises a lower and shorter chamber 228. Contained within lower chamber 228 is first magnetic member 210 which is connected to unlocking pin 208. First magnetic member 210 is smaller in diameter than the inside diameter of lower chamber 228 so first magnetic member 210 with unlocking pin 208 can move freely up or down. Spring-loaded stopper 216 is attached to the lower part of the lower chamber 228. One end of the unlocking pin 208 exits lower chamber 228 through small exit aperture 222 and keeps spring-loaded stopper 216 in a folded position. Inside top chamber 230 is a floating structure 212 with a second magnetic member 206 mounted on its lower part. Floating structure 212 can move freely up or down within top chamber 230. When TPL 200 is being placed into the filler tube 218, activation tube 204 is filled with diesel fuel, which makes floating structure 212 float inside of the activation tube 204. A top wall 226 is provided to restrain the floating structure 212 at a desired height when it is in floating position. In addition liquid injector 242 is provided to introduce the liquid inside activation tube 204 and maintain top wall 226. This allows the fluid or diesel fuel in this case to flow into filler tube 218 and fill the storage tank.

If gasoline is introduced into filler tube 218 and also activation tube 204 the gasoline will mix with the diesel or fill the inside of the activation tube 204, thus changing the density of the liquid inside activation tube 204, causing floating structure 212 to sink to the bottom of activation tube 204. When floating structure 212 reaches a predetermined distance close to the bottom of activation tube 204, second magnetic member 206 will pull up or attract first magnetic member 210 in lower chamber 228. Since unlocking pin 208 is attached to first magnetic member 2110, as first magnetic member 210 moves upwards, it will pull up unlocking pin 208, activating release mechanism 240, causing spring-loaded stopper 216 to open and in turn shuts down the flow of gasoline. To reset TPL 200 the operator has to close the unloading valve on the tanker, empty the hose and remove TPL 200 from filler tube 218 empty the fluid from activation tube 204 and unscrew bottom chamber 228 from the top chamber 230. The operator separates second magnetic member 206 from first magnetic member 210, fills up activation tube 204 with diesel which makes floating structure 212 float. Then he folds stopper 216 and secures it with unlocking pin 208 and then reattaches shorter tube 238 and TPL 200 is ready for another filling operation.

Supporting brackets 102 and 202 are configured to hold and keep activation tubes 104 and 204 in place. Although the figures show specific embodiments, supporting brackets 102 and 202 can vary in size, shape or form as long they are strong enough and allow the fuel to flow freely into filler tube 118 and 218 and into activation tubes 104 and 204. The preferred activation tubes 104 and 204 are constructed from a non-magnetic material. Small exit aperture 122 and 222 is preferably bigger in diameter than the unlocking pin 108 and 208, to allow movement of unlocking pin 108 and 208 and also to allow liquid to drain out of activation tube 104. Small exit aperture 122 cannot be big enough to create a suction force by the draining fluid since that would affect the floating ability of floating structures 112. On the upper part of tubes 104 and 204 are air or diesel release apertures 120 and 220. When the flowing liquid is introduced into tube 104 and 204, the displaced air or diesel exits through the air or diesel release apertures 120 and 220.

Floating structures 112 and 212 are selected from a specific material that is calibrated to float in a first type of fluid and to sink in a second type of fluid. For example, in the embodiments as described above, a material is selected that floats in diesel fuel and sinks in gasoline. Magnetic members 106, 110, 206, and 210 can be any type of magnetic material with sufficient attraction to pull the unlocking pins 108 and 208 from release mechanisms 130 and 240. The preferred floating structure 112 and 212 is a hollow cylindrical tube constructed from a chemical resistant plastic material. The tube is approximately 5/16 inch in diameter and 4 inches long with 1 mm wall thickness. It is sealed on one side and the other side is similarly sealed with a magnet affixed to the end. The magnet is a neodymium cylinder 1/4"×1/4" rare earth magnet. The buoyancy is provided by the air in the tube. The buoyant force on a submerged object is equal to the weight of the fluid that is displaced by the object. For example, if the floating structure is placed in diesel, and the amount of diesel displaced by the floating structure is heavier than the floating structure, then the floating structure will float. If the floating structure is placed in gasoline and the amount of gasoline displaced by the floating structure is lighter than the floating structure, then the floating structure will sink. To construct a floating structure that floats in diesel and sinks in gasoline the gravity of the floating structure should be somewhere between the gravity of the diesel fuel and the gravity of the gasoline fuel. Typical density of diesel fuel is around 0.850 g/cm$^3$. The density for gasoline fuel is around 0.735 g/cm$^3$ and 0.755 g/cm$^3$. For this combination the buoyancy for the floating structure should be around 0.800 g/cm$^3$. To achieve the desired volume weight, the proportions of the floating structure will vary depending on the material being used to construct it. The floating structure can also have two or more spacers mounted on its side to keep the floating structure in the middle of activation tubes 104 and 204. The spacers are usually made of the same materials as the floating structure's tube (not shown). In the alternative, the buoyancy can be provided by the tube material itself and the tube can be a solid material of any shape. Since the density of gasoline and diesel is affected by temperature it is also possible to use two floating structures, one for winter and one for summer with slightly different buoyancies. Although, a preferred embodiment of the floating structure for diesel and gasoline is described above, many other embodiments can be used to accomplish the same results for other fluids that are well known in the art.

Stoppers 116 and 216 are designed to stop the flow of the liquid when TPL 100 and 200 is activated. The configuration of stoppers 116 and 216 can be designed to resemble the inner portion of filler tubes 118 and 218. Although, the figures show a two-piece configuration for stoppers 116 and 216, other configurations, which are well known in the art, can be used.

Figure 5:
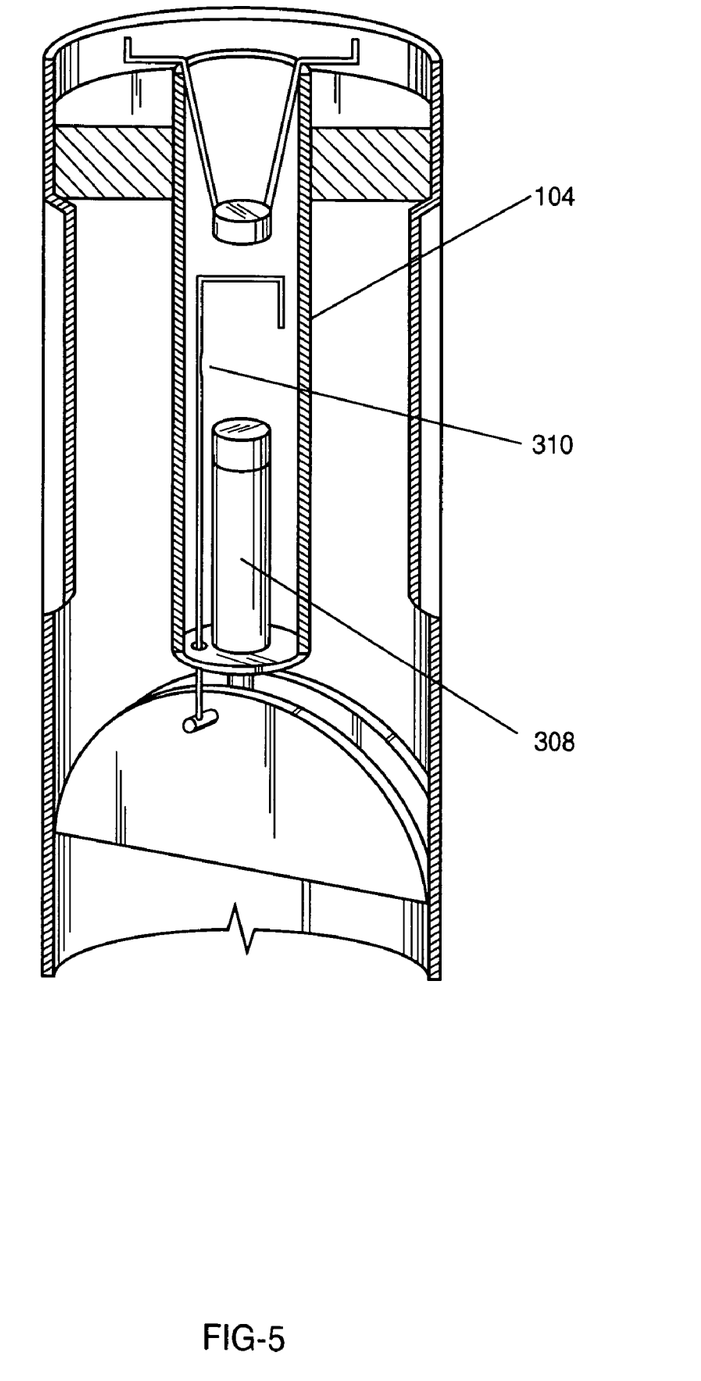
FIG. 5 shows an alternative embodiment for the activation mechanism.

There are several alternative embodiments for the present invention. In the invention of FIGS. 1 and 2, small exit aperture 122 can be just an exit hole and one or several drain holes can be added to the bottom of activation tube 104. In addition several air release apertures could be added as part of activation tube 104. On the upper opening of activation tube 104, a cover can be placed with smaller or bigger openings to control the flow speed of activation tube 104 and to reduce turbulence inside activation tube 104. Unlocking pin 108 can be placed inside or outside activation tube 104 and it does not have to be a pin, it can also be made of a flexible material like rope, chain, wire, etc. It can also be made out of a tube positioned inside activation tube 104 with an opening in the upper part and bottom part, and it could be used as an unlocking pin and an exit for the air 310 activated by floating structure 308, at the same time as shown in FIG. 5.

Figure 6:
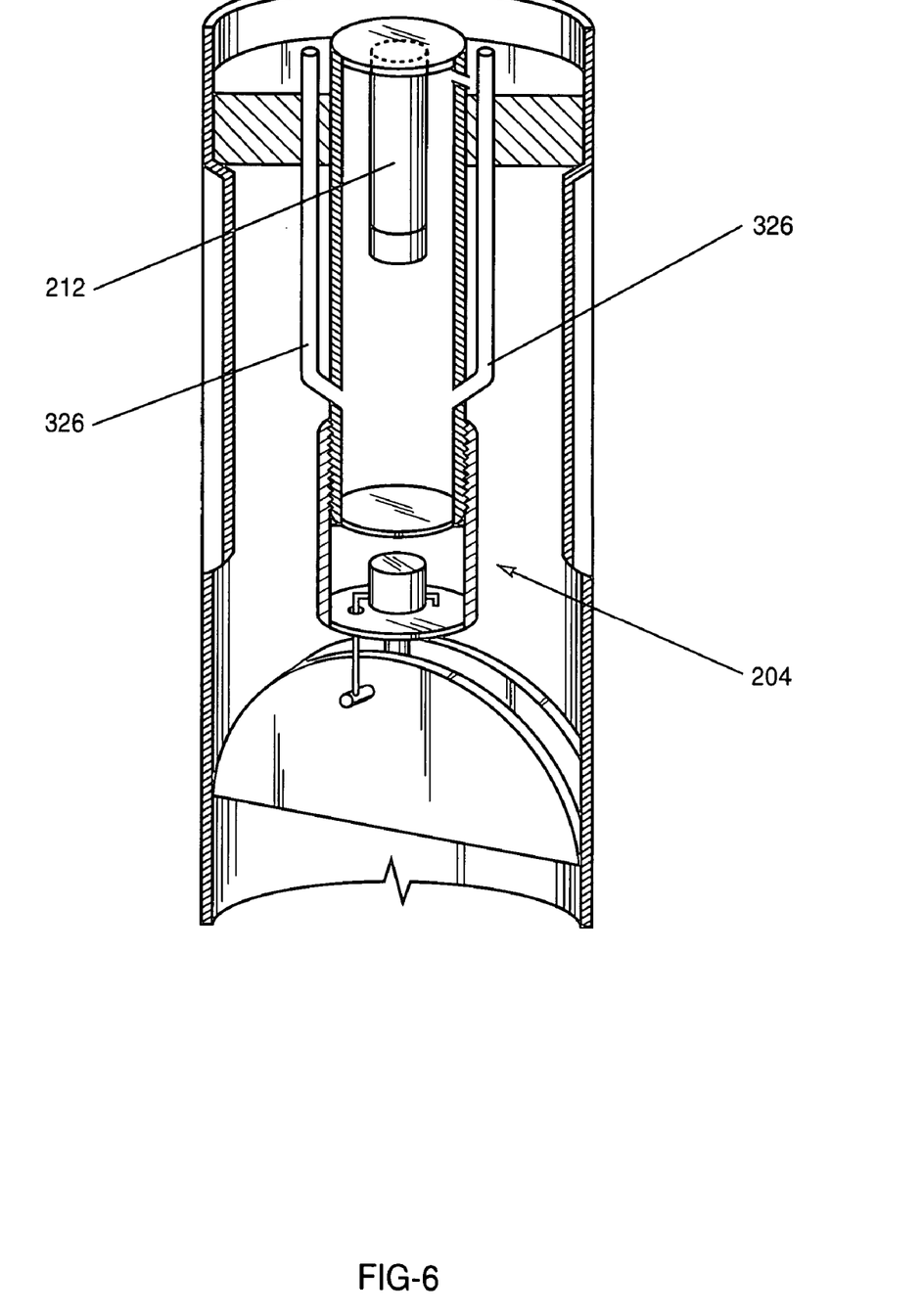
FIG. 6 shows an alternative embodiment for the fluid injectors of FIGS. 3 and 4.
Figure 7:
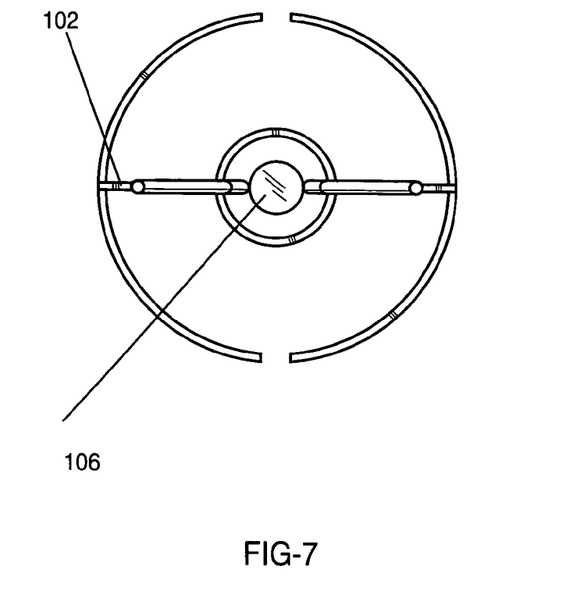
FIG. 7 is a top view of the embodiment of FIG. 1.
Figure 8:
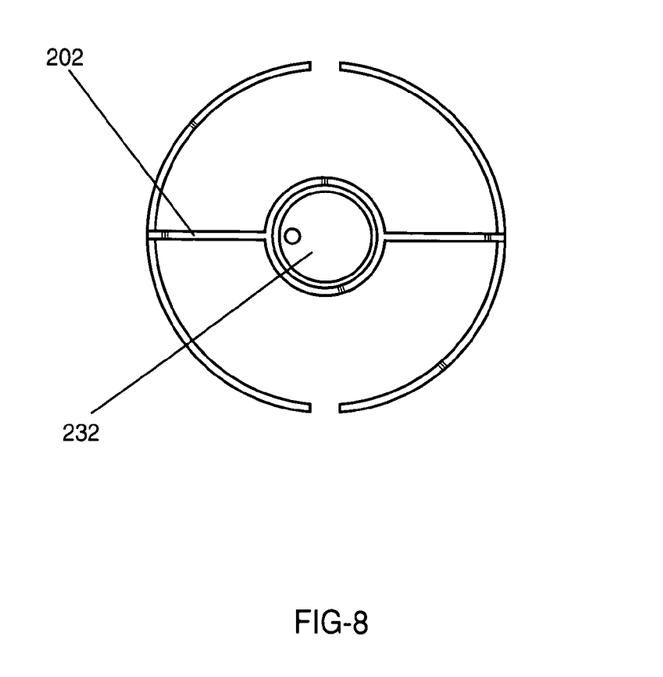
FIG. 8 is a top view of the embodiment of FIG. 3.

An alternative embodiment of the invention as shown in FIG. 6, liquid injector 326 can have one or several tubes extending into activation tube 204 and one or several injectors can be placed outside activation tube 204, as shown in FIG. 6. Any of these changes with different combinations are possible. It will not change the basic operation of the invention, but it would extend or reduce the activation time of the flow stopping action.

The present invention can be used in other applications where it is possible to mix liquids with different densities and the liquids are introduced by gravity or pumped. The invention shuts down the flow of the wrong liquids within 3 or 4 seconds from the start of the flowing procedure.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. An apparatus for discriminating between two fluids and allowing a first fluid to flow and preventing a second fluid from flowing in a filler tube, the first fluid comprising a first density and the second fluid comprising a second density, the apparatus comprising:

the discriminating apparatus disposed in an inlet of the filler tube;

an actuating tube for accepting a portion of the first or second fluid;

a magnetic structure comprising a material that floats in one of the two fluids, comprising the first density, and sinks in a second of the two fluids, comprising the second density, disposed in the actuating tube; and a stopper, the stopper comprising a filler tube blocking apparatus, that prevents the second fluid from flowing into the filler tube, said stopper being activated by the magnetic structure, whereby the magnetic structure floats or sinks, depending on a density of the fluid being introduced and magnetically attracts a stopper release apparatus when the magnetic structure reaches a predetermined distance to the stopper release apparatus.

2. The apparatus of claim 1 further comprising a second magnetic structure for magnetically attracting the floating magnetic structure when the floating magnetic structure reaches predetermined distance from the second magnetic structure.

3. The apparatus of claim 1 wherein said stopper comprises a spring loaded stopper.

4. The apparatus of claim 1 wherein said stopper release apparatus comprises an unlocking pin that is activated by the magnetic structure and unlocks a release mechanism.

5. The apparatus of claim 1 wherein said actuating tube comprises dual chambers, a first chamber for the magnetic structure and a second chamber for a second magnetic structure.

6. The apparatus of claim 5 further comprising a separating wall between the first chamber and the second chamber.

7. The apparatus of claim 1 further comprising at least one air release aperture in said actuating tube.

8. The apparatus of claim 1 wherein said actuating tube comprises at least one fluid injector.

9. The apparatus of claim 1 wherein said activation tube comprises a cover with at least one aperture to control a flow speed of the portion of the first or second fluid.

10. A method for discriminating between two fluids and allowing a first fluid to flow and preventing a second fluid from flowing in a filler tube, the first fluid comprising a first density and the second fluid comprising a second density, the method comprising the steps of:
   a) disposing a fluid discriminating apparatus to the filler tube;
   b) delivering at least a portion of the first or second fluid to an actuating tube, the actuating tube disposed in the fluid discriminating apparatus;
   c) magnetically activating a stopper disposed in the actuating tube, the stopper comprising a filler tube blocking apparatus that prevents the second fluid from flowing into the filler tube, by a magnetic structure that is immersed into the delivered at least a portion, by magnetically attracting a stopper release apparatus when the magnetic structure reaches a predetermined distance to the stopper release apparatus, the magnetic structure comprising a material that floats in one of the two fluids comprising the first density, and sinks in a second of the two fluids, comprising the second density; and
   d) stopping the second fluid from flowing into the filler tube by the magnetically activated stopper.

11. The method of claim 10 wherein the step of activating a stopper comprises activating a spring loaded stopper.

12. The method of claim 10 wherein the step of activating further comprises the step of pulling an unlocking pin from a release mechanism by a magnetic force produced by the floating magnetic structure and a second magnetic structure.

13. The method of claim 10 wherein said actuating tube comprises dual chambers, a first chamber for the floating magnetic member and a second chamber for a second magnetic structure.

14. The method of claim 13 further comprising the step of separating the first chamber from the second chamber.

15. The method of claim 10 further comprising the step of releasing displaced air from the actuating tube with at least on release aperture.

16. The method of claim 10 wherein the step of delivering comprises delivering via at least one fluid injector.

17. The method of claim 10 wherein the step of delivering comprises controlling a flow of the first or second fluid into the actuating tube.

* * * * *